United States Patent
Badolato Martin (10) Patent No.: US 10,824,152 B2
(45) Date of Patent: Nov. 3, 2020

(54) AUTOMATIC GUIDANCE SYSTEM FOR VEHICLES BY MEANS OF DIELECTRIC CHANGES IN A PRERECORDED RAIL-GUIDE

(71) Applicant: AUTO DRIVE SOLUTIONS S.L., Madrid (ES)

(72) Inventor: Alejandro Badolato Martin, Madrid (ES)

(73) Assignee: AUTO DRIVE SOLUTIONS S.L., Madrird (ES)

( * ) Notice: Subject to any disclaimer, the term of this patent is extended or adjusted under 35 U.S.C. 154(b) by 0 days.

(21) Appl. No.: 14/913,384

(22) PCT Filed: May 12, 2015

(86) PCT No.: PCT/ES2015/070378
§ 371 (c)(1),
(2) Date: Feb. 22, 2016

(87) PCT Pub. No.: WO2016/180992
PCT Pub. Date: Nov. 17, 2016

(65) Prior Publication Data
US 2018/0052464 A1 Feb. 22, 2018

(51) Int. Cl.
G05D 1/02 (2020.01)
H01Q 1/32 (2006.01)
H01Q 15/00 (2006.01)
G01S 13/75 (2006.01)

(52) U.S. Cl.
CPC .......... *G05D 1/0212* (2013.01); *G01S 13/751* (2013.01); *G05D 1/027* (2013.01); *G05D 1/0257* (2013.01); *G05D 1/0278* (2013.01); *H01Q 1/3225* (2013.01); *H01Q 15/0006* (2013.01); *G05D 2201/0213* (2013.01)

(58) Field of Classification Search
CPC .... G05D 1/0212; G05D 1/0257; G05D 1/027; G05D 1/0278; G05D 2201/0213; H01Q 1/3225; H01Q 15/0006; G01S 13/751; G01S 13/88
USPC .......................................................... 701/23
See application file for complete search history.

(56) References Cited

U.S. PATENT DOCUMENTS

| | | | | | |
|---|---|---|---|---|---|
| 2,996,137 | A | * | 8/1961 | Yaohan | G01S 13/75 180/168 |
| 3,550,077 | A | * | 12/1970 | Swift | G05D 1/0265 340/905 |
| 8,831,800 | B2 | * | 9/2014 | Parienti | G05D 1/0234 180/167 |

* cited by examiner

Primary Examiner — Muhammad Shafi
(74) Attorney, Agent, or Firm — Aslan Law, P.C.

(57) ABSTRACT

System of automatic guidance of vehicles by means of the detection of changes of the dielectric properties in a pre-recorded rail-guide, wherein the dielectric changes are detected by a high resolution radar device and wherein there is a control system of the vehicle that has the ancillary means required to convert it to an auto guidance system characterized in that the system is composed by a pre-recorded rail-guide (1) an information reading device (11) and auxiliary means of vehicle control (12).

20 Claims, 8 Drawing Sheets

AUTOMATIC GUIDANCE SYSTEM FOR VEHICLES BY MEANS OF DIELECTRIC CHANGES IN A PRERECORDED RAIL-GUIDE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

STATEMENT REGARDING PRIOR DISCLOSURES BY THE INVENTOR OR A JOINT INVENTOR

Not Applicable

BACKGROUND OF THE INVENTION

Field of the Invention

The field of the invention is the auxiliary automotive industry as well as the electronics industry.

Description of Related Art

There are a number of precedents on devices that perform the same function of autonomous driving of vehicles.

Among them the inventor knows the following:

U.S. Pat. No. 3,550,077 A. This invention relates to a guidance system for vehicles on the ground.

More particularly this system refers to a guidance system of vehicles using as the guiding element a copper cable.

This system is much more limited than that proposed in the present invention since it does not provide longitudinal or position information.

Moreover, the system installed on the road is not passive. It needs a generator.

U.S. Pat. No. 8,831,800: Refers to an automatic system of transportation that includes at least a vehicle without a driver that moves from one point to another following a rail integrated in the pavement that has optical characteristics and a set of chips arranged at regular intervals.

This system, more evolved than the one previously described, suffers from major problems, since the guidance system is optical and is therefore subjected to great lighting contrasts that hinder the operation of the detectors.

Under fog or rainy conditions the system may be seriously affected.

The transponder system does not allow having an appropriate longitudinal resolution (it is not possible to install a transponder each centimeter).

Furthermore, these transponders also can be affected by working in extreme environmental conditions or by the existence of interferences.

On the other hand, the integrity of the system is compromised as an interfering transmission can simulate the signal from one of the transponders.

The proposed invention in this specification solves all of the above problems with absolute reliability because the proposed system has a centimeter resolution throughout the track and not only in the places where the transponders have been placed.

It is also important to highlight that the media where the data is recorded in the proposed system can be a polymeric material which has a good preservation capacity in adverse environments and also, due to a high transmitting bandwidth, the capacity for interference is negligible since, if the interfering signal is minimally different from the transmitted signal (something that happens in practice with two identical systems), the processing gain will be low (see spread-spectrum techniques) and the received power will not be correctly added.

The inventor is not aware of any prior background incorporating the provisions that are provided by the current invention, nor the advantages inherent in these provisions.

BRIEF SUMMARY OF THE INVENTION

The proposed invention refers to a system of automatic guidance of vehicles by means of the detection of changes of the dielectric properties in a pre-recorded rail-guide, wherein the dielectric changes are detected by a high resolution radar device and wherein the control system of the vehicle has the ancillary means required to convert it to an auto guidance system.

BRIEF DESCRIPTION OF THE SEVERAL VIEWS OF THE DRAWINGS

For a better understanding of the invention attached can be found a sheet of drawings in which the following is appreciated FIG. 1. Perspective view and with a side cut in the lane.

And in said figures, identical elements have the same reference, among which it can be distinguished:
(1).—rail-guide,
(2).—dihedral from the right side band
(3).—dihedral from the left side band,
(4).—dihedral in the logic level "1",
(5).—dihedral in the logic level "0",
(6).—border at the end of the trail,
(7).—collocation shoulders,
(8).—upper border non visible,
(9).—logic level "1",
(10).—logic level "0",
(11).—information reading device
(11.1).—radar sensor
(11.2).—antenna
(12).—auxiliary means of the control of the device
(12.1).—communication means by systems V2V,
(12.2).—means to detect the rail-guide,
(12.3).—global positioning an navigation means, (12.4).—vehicle and obstacle detection means.
(12.5).—inertial systems,
(12.6).—incidences and traffic signals communication means.

DETAILED DESCRIPTION OF THE INVENTION

The proposed invention refers to a system of automatic guidance of vehicles by means of the detection of changes of the dielectric properties in a pre-recorded rail-guide, wherein the dielectric changes are detected by a high resolution radar device and wherein the control system of the vehicle has the ancillary means required to convert it to an auto guidance system.

It is proposed a solution that allows for the information encoded in a non-conducting material to be read through the existence or not of boundaries of change in the dielectric constant in the medium which are perceivable using radar techniques.

The boundaries in the change of dielectric in a non-conducting material cause that part of the energy radiated toward the material is reflected. This reflected energy is detected by the radar system being possible to determine the radial distance where the discontinuity is to be found.

The boundaries of change of dielectric can be set using two materials or substances whose dielectric constants are different or using a single material where the boundary is set between the material and the vacuum or the material or a gas or substance. An example of the latter is the difference that is created in a polymeric material that presents holes or recesses filled with air.

Using in the radar system an electromagnetic energy radiating system (Antenna or horn) which radiation diagram is narrow, it is possible to channel the greater part of the transmitted energy in a small volume.

By applying these principles, it is possible to build a sensor that is capable of determining the existence of a characteristic pattern of reflections that the system is capable of interpreting as binary information or other sort of information.

An example of an application of this technology is a guidance system of vehicles that reads the previously recorded information in a non-conducting material. The reading of this information may help to be able to accurately determine its position, which can be of help for an automatic guidance system of vehicles.

The proposed system is a radar device in the millimeter or sub-millimeter bands and even higher frequency (up to the limit of the visible spectrum) that transmits with a high bandwidth. Thanks to the high working frequency, it is possible to build electrically large radiant systems that allow for highly directive radiation beams with reduced physical dimensions.

A radiant element of these features docked in a car (preferably on the underside of the same) can light up a surface on the track (located preferably at a distance to the radar below one meter) the area of which is less than one square centimeter.

The radar queries the lighted up area at constant intervals of time (which are of the order of microseconds) transmitting at a particular bandwidth (on the order of tens of gigahertz). With the received signal and by processing using techniques of radar processing, a profile of the distances is obtained (level of detection of reflected signal as a function of the radial distance from the radar). At those radial distances where there is a boundary of change of dielectric, an increase at the level of received power will occur.

Whenever the beam of the antenna lights up the track, a reflection is produced at the boundaries identified as 4 and 5, generating a known pattern determined by the distance between the two surfaces. The pattern shift control will detect such a pattern and will recalculate the distances of the detections taking as a reference of origin the surface 4.

Based on the information supplied by the pattern shift control, the boundary identifier will decode the information stored in the aiming direction of the antenna denoting the information read from the central band of the track and the possible detection of each one of the lateral bands.

If the combination of the boundaries identified in a particular radar query matches one of the possible combinations that the track can generate at a certain point, the system will increase a counter. Similarly, each time that the combination does not correspond to one of the possible combinations the counter will be decremented.

When the counter value exceeds a certain threshold of accounting of possible combinations the detector of vehicle on track will flag the detection of the track to the positioning system. When the threshold is not reached, the detector will likewise notify.

When the beam of the antenna is perfectly centred in the central band of information (3), the dihedrals of detection of lateral offset (1 and 2) are not lit up. This way, there will not be any detection associated to the radial distance of none of the dihedrals (1 and 2) in the distances profile. When the beam is slightly offset to one side, the corresponding side dihedral is partially lit up, producing a reflection. Identifying the distance at which the reflection occurs, the system is able to determine the side to which the trajectory has to be corrected.

Analyzing the sequence of the distances profiles, an implemented algorithm is able to detect the transition between two consecutive pre-recorded information. When such an event happens, the progress will be notified to the positioning system the information of the position of the vehicle can be updated.

Provided that the detector of vehicle over the track indicate a correct lighting and taking advantage of the detections of the longitudinal advance, this detector will store consecutively each piece of information associated with the central strip. Using a synchronism header known or a similar mechanism, the detector will be able to identify the first information about the message of positioning. Analysing several consecutive information the system is able to read the pre-recorded code on the tape. This code corresponds to a univocal identification between the start of the message position and a system of coordinates of the land surface that is known by the system. This message is recorded continuously over the entire track. In addition, since the system has in its memory recorded the route followed by the track, each time that you detector information of longitudinal advance are received, the positioning system is able to recalculate the new position of the vehicle and report it to the automatic driving system.

The automatic driving system is capable of conducting the vehicle to the destination chosen by the navigation system. To do this, it is mainly supported by the positioning system and by the inertial systems of the vehicle.

Performing at a high working frequency allows the devices to transmit a bandwidth of about tens of Gigahertz that allow clarifications to the extent of the radial distance from the radiant element to the border of dielectric change below one millimeter (this does not depend on the bandwidth but on the frequency of work) and resolutions (ability to discern two borders of change of dielectric next) lower than one centimeter. Furthermore, the penetration capacity of waves on materials at these frequencies is high (provided that the media is not the driver or is composed of water).

An example of a non-conducting means wherein it is possible to record the information may be a plastic band dimensions of which are in the range of cm and even lower.

Taking as an example a continuous wave radar and frequency modulated to transmit a bandwidth of 34 GHz (for example, at the frequency of 340 GHz wherein there is a window of atmospheric absorption that implies a low attenuation) it is possible to project the energy radiated in the firm of a road where there is located level with thereof or a few centimeters under the asphalt layer a plastic band with dimensions that can be 1.5 cm wide and 5 cm deep. As shown in the drawing, the plastic guide embedded in the road has a number of gaps that produce reflections that are detected by the radar system and interpreted as information.

A possible ramp time chirp can be 37.5 us. Therefore, it s obtained a sample of the distances profile that it is being illuminated by the antenna each 37.5 us. This way, a vehicle driving at 120 Km/h interrogates until 16 times between two consecutive information.

The sequence of two consecutive bits '1' will produce a progressive decrease of the signal level of the peak associated with the bit (does not illuminate properly the dihedral) to appear again with the maximum intensity (which occurs when the radiant system illuminates the dihedral axis of symmetry).

The information from '0' can be generated by the absence of discontinuity at the expected distance in the '1' or by mechanizing a dihedral to a different depth.

Figure 1:
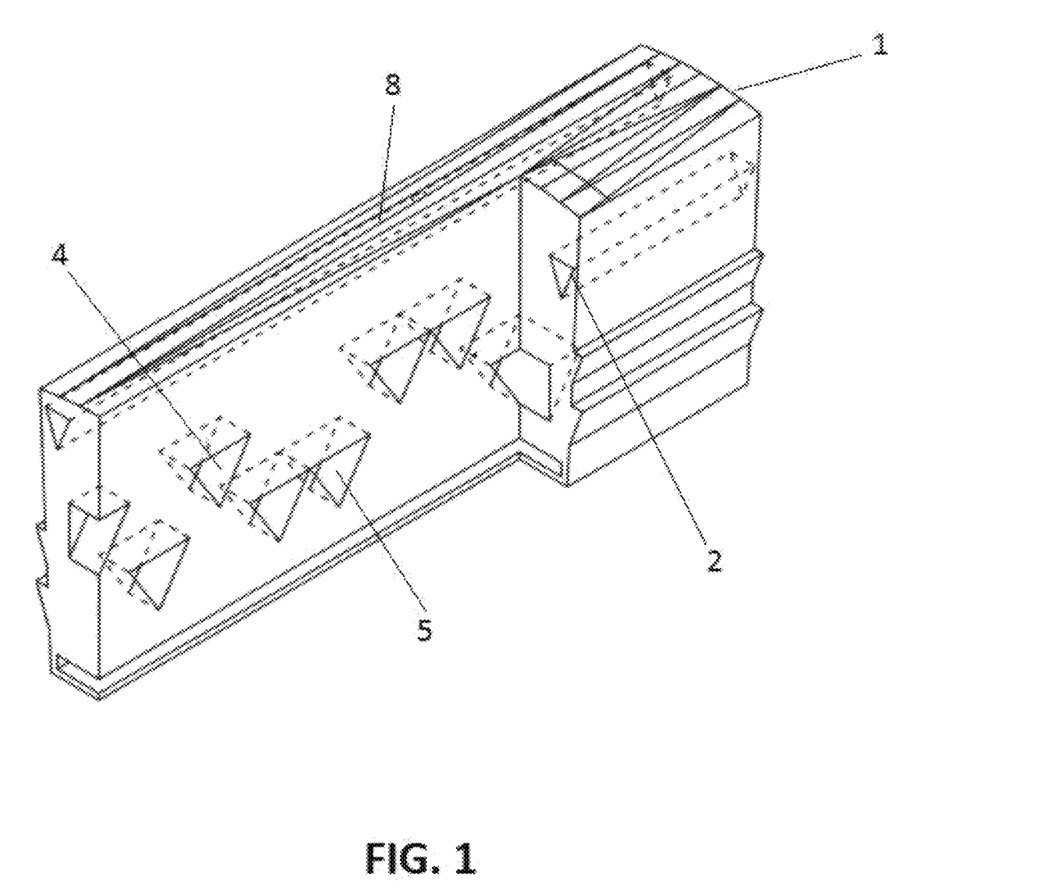
Figure 2:
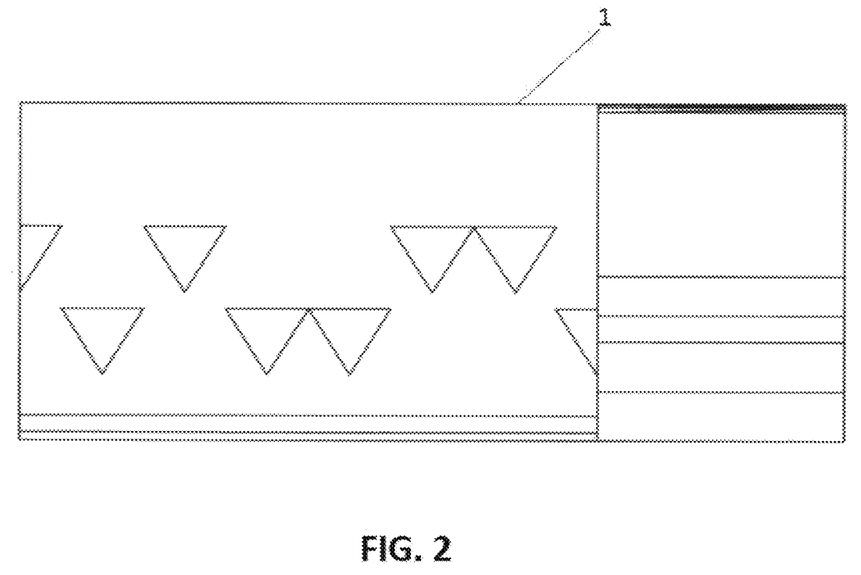
FIG. 2.—Lateral cut view of the lane.
Figure 3:
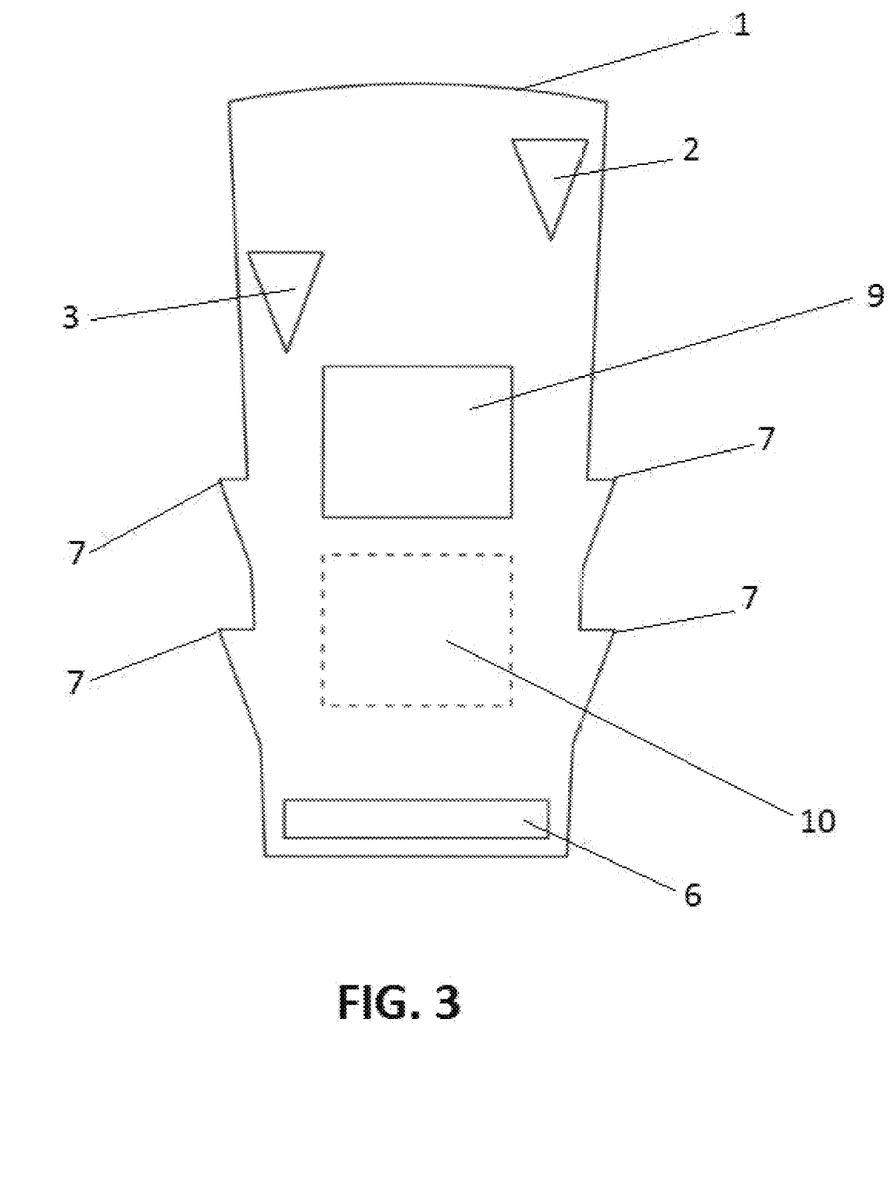
FIG. 3.—Perpendicular section view of the lane.
Figure 4:
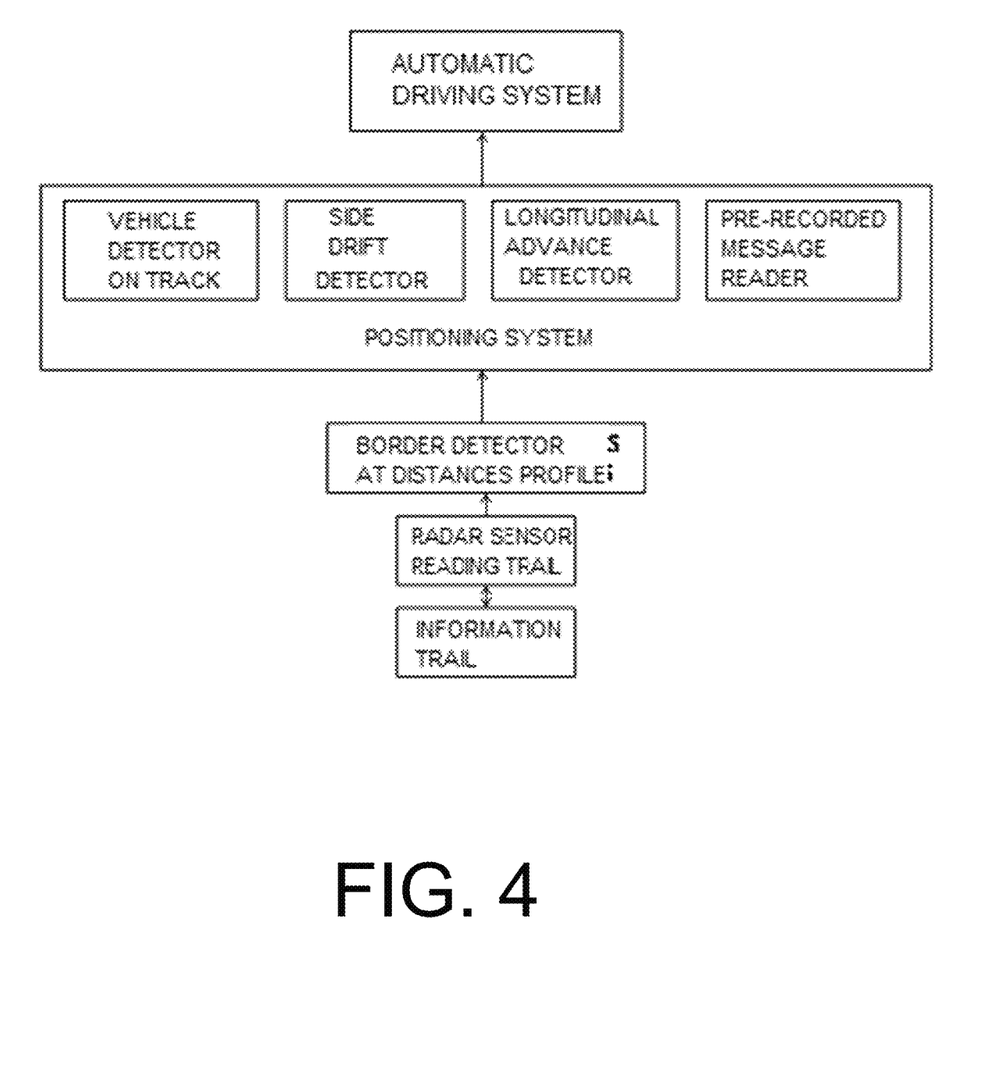
FIG. 4.—Diagram that represents the pre-recorded message that may exist on the road, namely, the radar sensor detects the borders in the distances profile, being configured as a positioning system, detecting the vehicle on the rail-guide, the lateral drift and the longitudinal advance.
Figure 5:
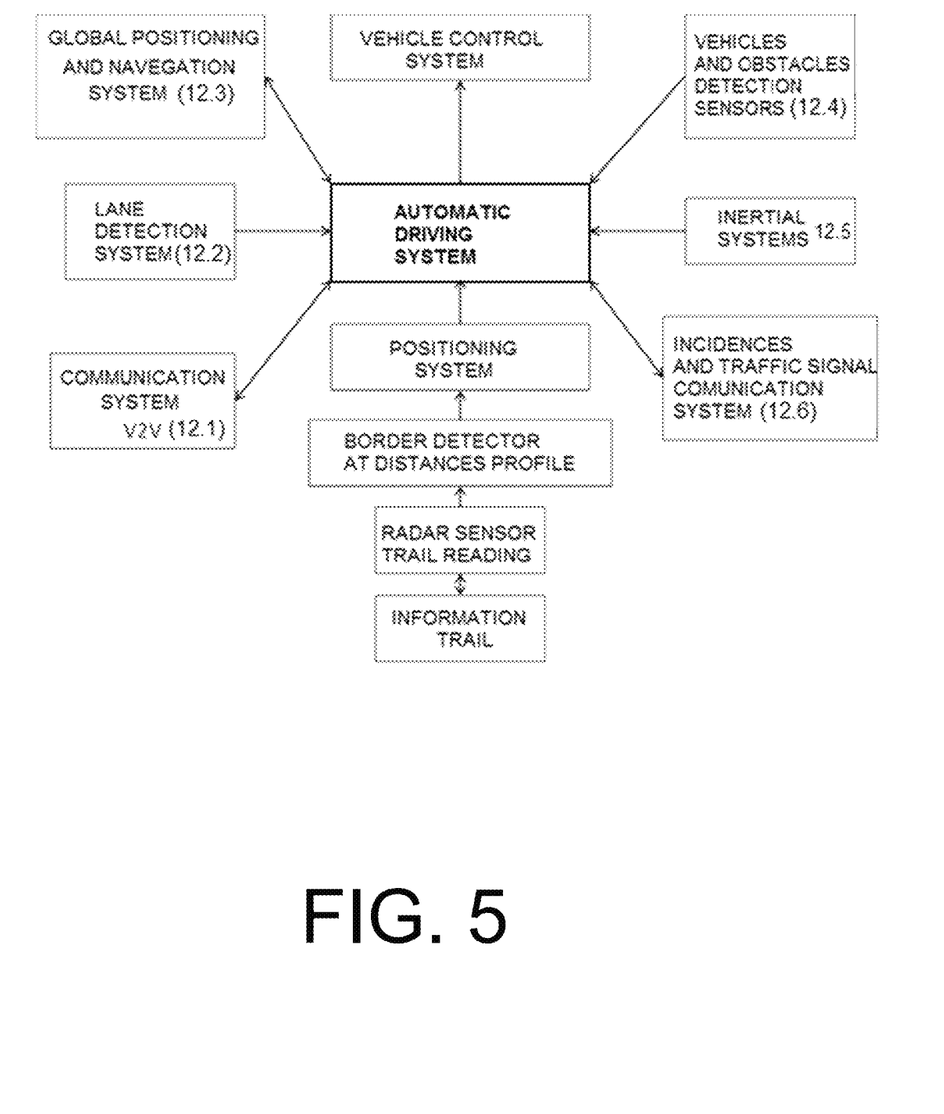
FIG. 5.—Diagram presenting the auxiliary means of the control of the vehicle
FIG. 6.—Shows the information reading devices (11)
FIGS. 7 AND 8.—Show the auxiliary means of the control of the device (12)
Figure 6:
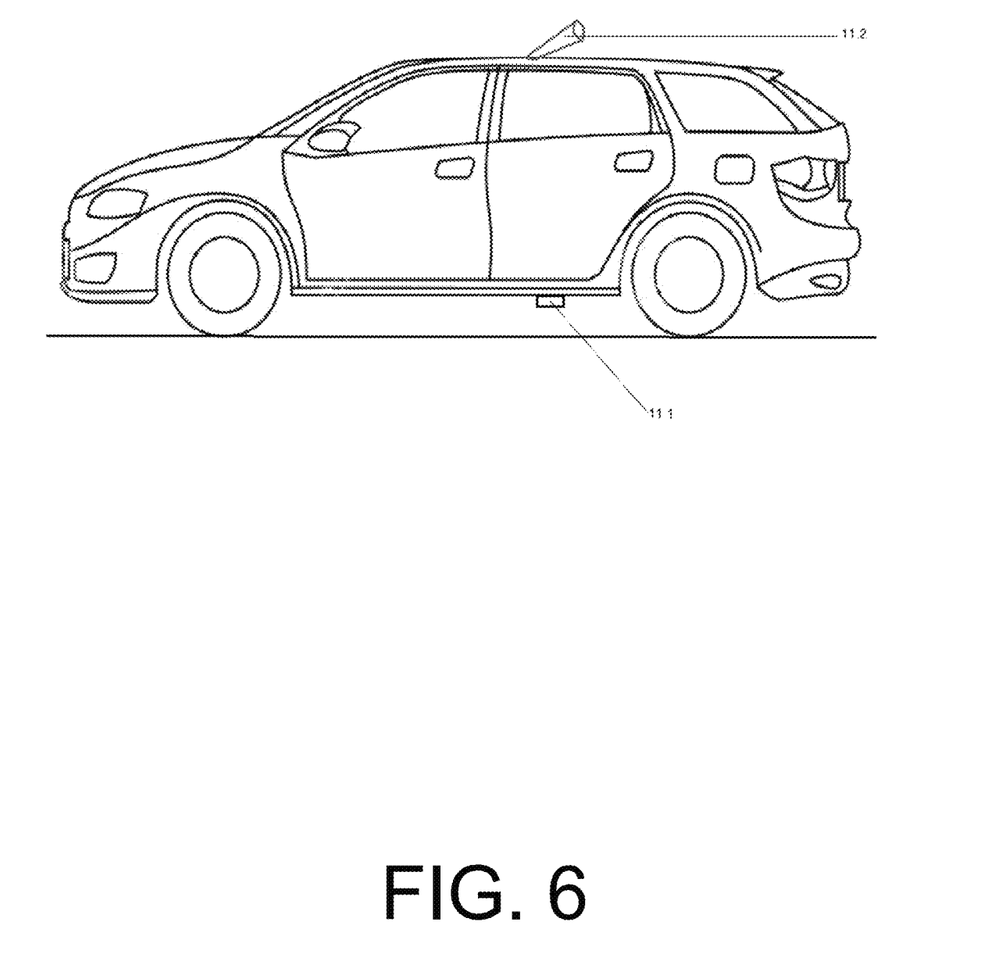
Figure 7:
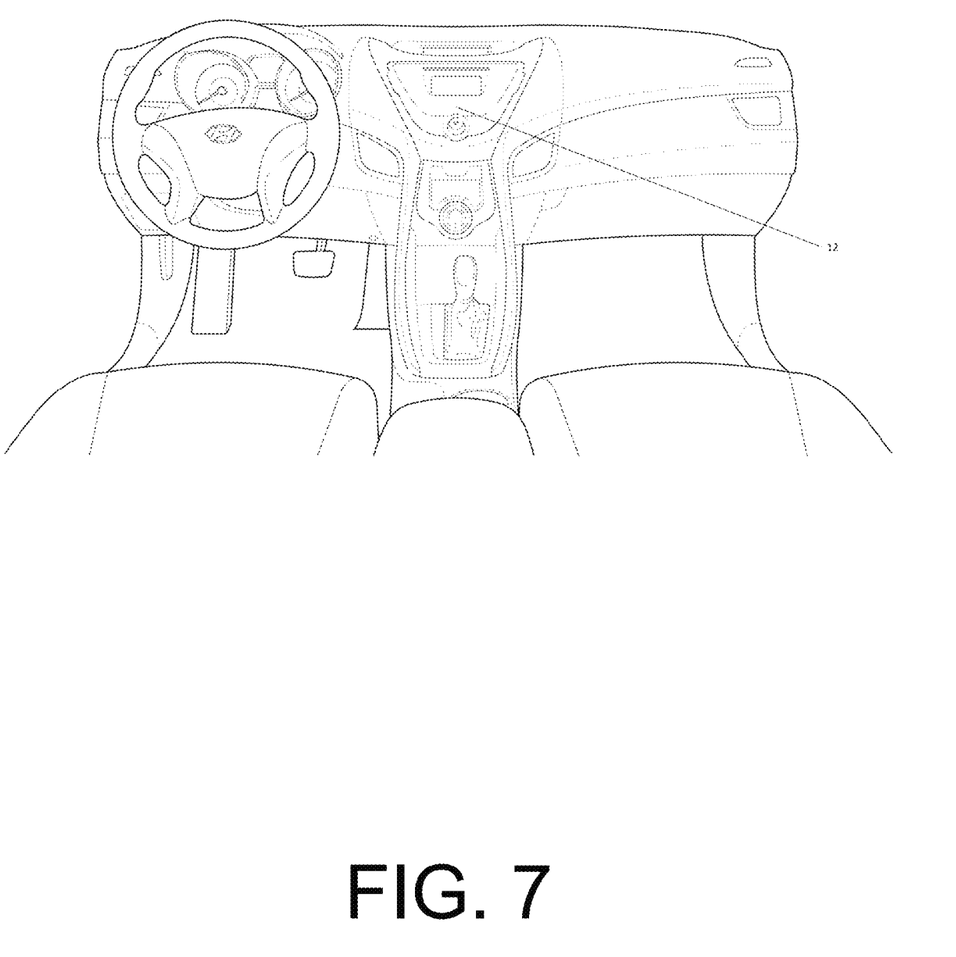
Figure 8:
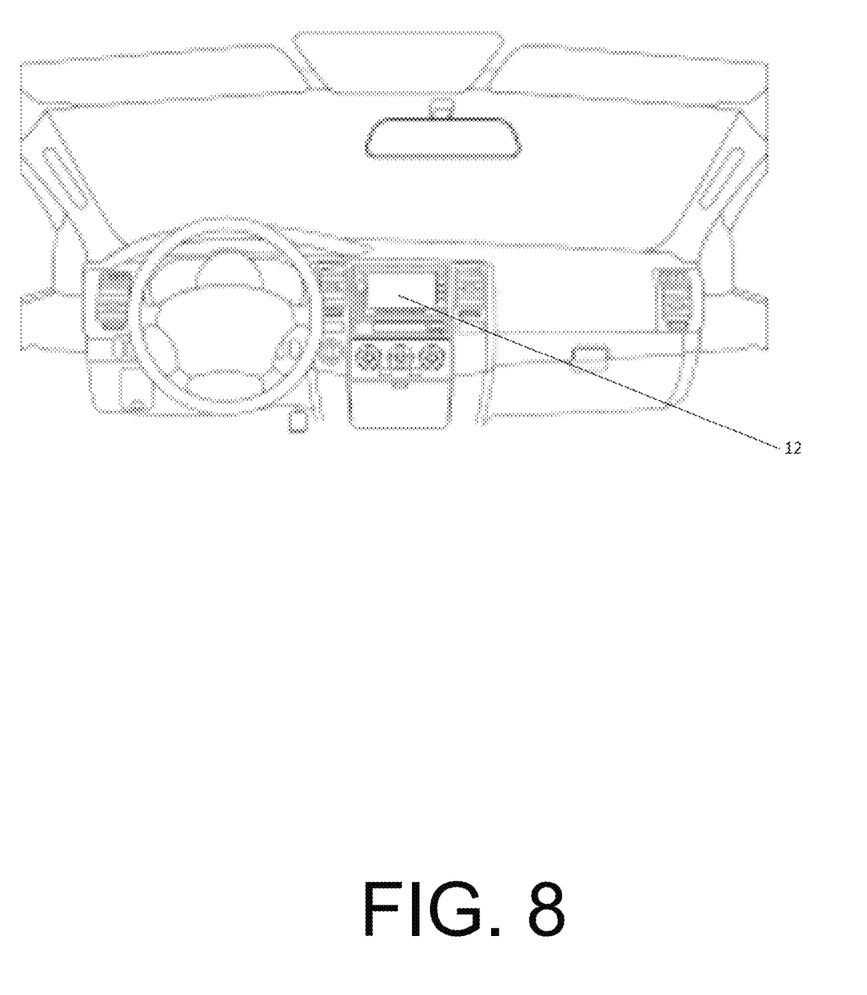

To facilitate to the vehicle guidance system the information on the lateral drift thereof, longitudinal bands can be mechanized to lower distances. For example, at 1 cm a longitudinal dihedral can be placed to the left and a 1, 5 to the right 1.5 as shown in FIG. 1.

This way, when the radiation diagram enlightens the central part of the band will the detections will only be obtained at the distances associated with the region wherein the information has been coded (at a distance of about 15 or 16 cm related to the radar sensor) but if it starts to move laterally towards the left a signal will start to be received at a distance of 12.5 cm which level will be greater as the diagram enlightens to a greater extent the side dihedral. If, in contrast, the vehicle moves towards the right, the peak will appear at a distance of 13 cm.

In the code of '1's and '0's the information about the coordinates by which passes the road can be recorded. Using the 56 bit decoding it is possible to identify uniquely each square decimeter of the ground surface.

That is to say, in less than 0.56 meters of trail decoded, detailed information about the vehicle circulating can be obtained. It should be noted that the guidance system has stored the sequence of positions through which the road passes. This fact offers advantages to the receiver, allowing the reduction of the likelihood of a reading error.

The guidance system of the vehicle may have loaded in its memory the morphology of the road. This way, the guidance system of the vehicle can anticipate changes in the direction, adapt the speed in certain areas o increase the engine power to face a high slope.

In addition to work with very low powers (even of tens of microwatts), the possibility of interference between systems, even of the same model, is not possible. This is due to the high bandwidth transmitted. The interference with systems that operate at different frequencies is discarded.

The radar system can contain 2 antennas (transmitter o receiver) or only one (through the use of circulators or even by taking advantage of the local oscillator signal of the mixer that is transmitted by the receiver horn due to the finite isolation between the door OL and the horn.

Description of the Preferred Embodiment

The proposed invention refers to a system of automatic guidance of vehicles by means of the detection of changes of the dielectric properties in a pre-recorded rail-guide, wherein the dielectric changes are detected by a high resolution radar device and wherein the control system of the vehicle has the ancillary means required to convert it to an auto guidance system.

More particularly, the system is composed of the following elements:

pre-recorded rail-guide (1)
information reading device (11)
auxiliary means of the control of the vehicle. (12)

The pre-recorded rail-guide (1) is composed of a piece with a straight rectangular parallelepiped, with various shoulders on their sides (7) for correct attachment and its is manufactured in non conductive material, preferably polyethylene.

The rail-guide (1) will be installed level with the firm of the road, although it can optionally be hidden under a layer of asphalt treated with a layer of hydrophobic material.

The preferred dimensions of the rail-guide (1) are 1.5 cm wide by 5 cm deep.

Inside, the boreholes will be mechanized, being the boreholes preferred form that of dihedrals, since the planes of the dihedrals increase the reflected signal, facilitating therefore its detection.

The situation of the dihedrals that create the borders is the following:

The dihedrals of the centre band (4 and 5) are oriented perpendicular to the side strips (2 and 3), since in the first case it is pretended obtaining a variable signal level according to the longitudinal advance of the vehicle along the track and in the second case, it is obtained based on the lateral drift thereof by way of border.

The dihedrals of the side strips (2 and 3) are located at the same distance from the outer edges but at different heights, so the border established in each end is easily identified.

The dihedrals of the centre band (4 and 5) are located in the central area of the lane, located perpendicular to the external dihedrals and at different heights, to determine at least two logical levels, a logical level "1" the upper one and a logical level "0" the lower.

There is also a lower border at the end of track (6) in the bottom, as well as a border at the upper part (8), being the lower part formed by a borehole and the upper one (8) by the dielectric difference between the material of the rail (1) and the air or the asphalt (in the case of the rail-guide buried).

The preferred way to code the rail message is based on a binary codification. The logic "1" is associated with the detection of an higher dihedral and the "0" with that of a lower one.

In the code of '1's and '0's the information about the coordinates by which passes the road can be recorded. Using the 56 bit decoding it is possible to identify uniquely each square decimeter of the ground surface.

With the codes of randomization as a help, it is possible to avoid the sequences of '1' or '0' long that may cause ambiguity in the measure.

Once the vehicle has traveled 0.56 m and knows the exact point (with an accuracy of less than 1 cm in the three axes xyz), the number of bits to increase by cm the value of the position can be counted (which will be updated again every 0.56 meters).

That is to say, in less than 0.56 meters of trail decoded (or even at a lower distance), detailed information about the vehicle circulating can be obtained. It should be noted that the guidance system has stored the sequence of positions through which the road passes. This fact offers advantages to the receiver, allowing the reduction of the likelihood of a reading error.

The guidance system of the vehicle may have loaded in its memory the morphology of the road by which it passes. This way, the guidance system of the vehicle can anticipate changes in the direction; adapt the speed in certain areas o increase the engine power to face a high slope.

In addition to working with very low powers (even of tens of microwatios), the possibility of interference between systems, even of the same model, is not possible. This is due to the high bandwidth transmitted. The interference with systems that operate at different frequencies is discarded.

The radar system can contain 2 antennas (transmitter o receiver) or only one (through the use of circulators or even by taking advantage of the local oscillator signal of the mixer that is transmitted by the receiver horn due to the finite isolation between the door OL and the horn.

information reading device.

To read the information of the rail-guide, a a radar sensor installed preferably to the underside of the vehicle is used.

The required antenna is an antenna electrically large to limit the size of the track To obtain an enlightened area of about 1 square cm (defined area at 3 dB) and to have a resolution related to the distance of 1 cm, it is required to transmit a signal centred on 340 GHz (window of atmospheric attenuation) with a bandwidth of 34 GHz.

With this bandwidth, a resolution at a theory resolution is obtained (capacity to solve two near borders) defined by the equation $$\Delta R = \frac{C}{2B} = 4.4 \text{ mm}$$

wherein c is the speed of light in the media and B the bandwidth transmitted.

The antenna can be a horn of high gain or its combination a lens or a reflector to concentrate more effectively the energy radiated in the volume of interest.

The antenna is protected by a radome whose material is hydrophobic and water repellent.

The preferred radar sensor is a continuous wave radar and modulated frequency (Linear Frequency Modulated Continuous Wave Radar) that transmits a chirp signal with a period of 37.5 µs. With this ramp period, a vehicle circulating at 120 Km/h will interrogate 16 times between 2 consecutive boreholes separated 1 cm.

The power level transmitted is of the order of a few dozen µW. This power level is easy to obtain using a single horn as element of transmission and reception and a subarmonic mixer.

Applying a local oscillator power of 10 dBm and considering that the product 20L has a finite isolation towards the horn of 30 dB, it is achieved a transmission power of 10 µW.

The radar signal to transmit is obtained through the generation at a low frequency of a chirp signal through a DDS (Direct Digital Synthesizer) and the use of power multipliers, oscillators and subsequent power amplifiers.

The signal at the mixer output (beat signal) is amplified by an LNA (Low Noise Amplifer), filtered and subsequently digitized by an ADC (Analog to Digital Converter) that samples at a rate of 8 MS/s.

A FPGA (Field Programmable Gate Array) applies a FFT (Fast Fourier Transform) to each period of the received signal to obtain the distances profile of each interrogation.

The rest of the logic of the systems that have to be implemented can be performed using ASICs, FPGAs, PCs etc.

At the work frequency proposed, the water presents a high electromagnetic absorption capacity.

So the radar signal can penetrate the firm of the track and reach the polymer rail-guide, it is necessary the absence of water between the radar and the propagation direction of the waves.

Therefore, the presence of water on the surface of the track where the rail-guide is located has to be avoided or in the same rail-guide when it is positioned at the circulation road level.

In this case, it is proposed that the profile of the rail-guide should have a slight slope towards the sides of the road to facilitate the evacuation of the water which could fall.

Both the rail-guide and the tread of the track that can cover it can be treated with repellent and hydrophobic paints.

The radar sensor may be fitted with a blowing element to point in the area illuminated by the antenna in order to facilitate the evacuation of the water on the surface.

In addition, the blowing jet may be heated to be able to melt snow or ice sheets that can be formed.

Having sufficiently described the nature of the invention, as well as how to be implemented, it must be stated that the provisions referred to above and shown in the accompanying drawings can be modified in detail provided they do not alter the fundamental principles set out in the above paragraphs and summarized in the following claims.

The invention claimed is:

1. A system of automatic guidance of vehicles by means of detection of changes of dielectric properties in a pre-recorded rail-guide, wherein the changes of the dielectric properties are detected by a high resolution radar device and wherein there is a control system of the vehicle that has the ancillary means required to convert it to an auto guidance system wherein the system is composed of the following elements:

a pre-recorded rail-guide
information reading devices
auxiliary means of the control of the vehicle,
wherein the pre-recorded rail-guide is composed of a piece with a straight rectangular parallelepiped with various shoulders located on its side faces, manufactured in non-conductive material, preferably polymeric and with preferred dimensions of 1.5 cm width and 5 cm deep.

2. The system according with claim 1, wherein, in the pre-recorded rail-guide there are different boreholes mechanized, being the preferred form of the boreholes, in the inner area, that of the dihedral that generate borders of dielectric change, while in the upper part, the border created by the dielectric differentiation between the lane material and the surrounding air.

3. The system according with claim 2, wherein the central band dihedrals are oriented in perpendicular form related to that of the side bands, while the side bands dihedrals are located at the same distance from the external edges but a different height.

4. The system according with claim 3, wherein the dihedrals of the centre band are located in the central area of the rail-guide, located perpendicular to the external dihedrals and at different heights, to determine at least two logical levels, a logical level "1" as the upper one and a logical level "0" as the lower one.

5. The system according with claim 4, wherein there is a lower border end of trail at the lower part of the rail, as well as a border in the upper part, being constituted said border by the dielectric differentiation between the material of the rail and the surrounding media.

6. The system according with claim 5, wherein the information reading device in the rail-guide uses a radar sensor installed on the underside of the vehicle with an antenna composed of a dual horn Potter type and a lens or reflector that enlighten a 1 square cm area of the road (area defined by 3 Db) and having a resolution at a distance of 1 centimeter, for what it is required the transmission of a frequency signal and a sufficient bandwidth and being the antenna protected by a radome composed of hydrophobic and water repellent material.

7. The system according with claim 6, wherein the radar sensor is preferably a continuous wave radar and modulated frequency LFMCW (Linear Frequency Modulated Continuous Wave Radar) that transmits a chirp signal with a period of 37.5 $\mu$.s.

8. The system according with claim 7, wherein the power level is obtained using a single horn as element of transmission and reception and a subharmonic mixer.

9. The system according with claim 8, wherein applying a local oscillator power of 10 dBm and considering that the product 2 OL has a finite isolation towards the horn of 30 dB, it is achieved a transmission power of 10 $\mu$W.

10. The system according with claim 9, wherein the radar signal to transmit is obtained through the generation at a low frequency of a chirp signal through a DDS (Direct Digital Synthesizer) and the use of power multipliers, oscillators and subsequent power amplifiers.

11. The system according with claim 10, wherein the signal at the mixer output (beat signal) is amplified by a LNA and subsequently digitized by an ADC (Analog to Digital Converter) that samples at a rate of 8 MS/s. A FPGA applies a FFT (Fast Fourier Transform) to each period of the received signal to obtain the distances profile in each interrogation.

12. The system according with claim 11, wherein the radar sensor will be provided with a blowing element directed toward the enlightened area by the antenna in order to facilitate the evacuation of the stored water on the thread surface of the road where it is installed or on the same surface of the rail-guide wherein the blowing jet can be heated to be able to melt snow or ice sheets that could be formed.

13. The system according with claim 1, wherein the means required to control the vehicle would be communication means by systems V2V.

14. The system according with claim 1, wherein the means required to control the vehicle would be means to detect the rail-guide.

15. The system according with claim 1, wherein the means required to control the vehicle would be global positioning an navigation means.

16. The system according with claim 1, wherein the means required to control the vehicle would be vehicle and obstacle detection means.

17. The system according with claim 1, wherein the means required to control the vehicle would be inertial systems.

18. The system according with claim 1, wherein the means required to control the vehicle would be incidences and traffic signals communication means.

19. The system according with claim 1, wherein the rail-guide will be installed at the thread layer level of the road where it is to be installed.

20. The system according with claim 1, wherein the rail-guide can be hidden under the thread of the road where it is to be installed and said thread is treated with a water repellent paint.

* * * * *